US 8,638,656 B2

(12) United States Patent
Croak et al.

(10) Patent No.: US 8,638,656 B2
(45) Date of Patent: *Jan. 28, 2014

(54) METHOD AND APPARATUS FOR ROUTING CALLS TO AN ALTERNATIVE ENDPOINT DURING NETWORK DISRUPTIONS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 456 days.

This patent is subject to a terminal disclaimer.

(21) Appl. No.: 12/647,480

(22) Filed: Dec. 26, 2009

(65) Prior Publication Data

US 2010/0098067 A1 Apr. 22, 2010

Related U.S. Application Data

(63) Continuation of application No. 11/109,130, filed on Apr. 19, 2005, now Pat. No. 8,064,452.

(51) Int. Cl.
*H04L 12/28* (2006.01)
*H04J 1/16* (2006.01)

(52) U.S. Cl.
USPC ........... 370/216; 370/252; 370/238; 370/352; 370/442

(58) Field of Classification Search
USPC .......................... 370/252, 238, 216, 352, 442
See application file for complete search history.

(56) References Cited

U.S. PATENT DOCUMENTS

| 4,278,844 | A | 7/1981 | Jones |
| 5,515,176 | A | 5/1996 | Galen et al. |
| 6,330,323 | B1 | 12/2001 | Gottlieb et al. |
| 6,411,681 | B1 | 6/2002 | Nolting et al. |
| 6,577,718 | B1 | 6/2003 | Kalmanek, Jr. |
| 6,687,356 | B1 | 2/2004 | Giltho et al. |
| 6,754,180 | B1 | 6/2004 | Christie |
| 6,868,060 | B2 * | 3/2005 | Barzegar et al. ............... 370/228 |
| 7,088,810 | B1 | 8/2006 | Burg |
| 7,155,528 | B2 | 12/2006 | Tam |
| 7,161,923 | B2 | 1/2007 | Young |
| 7,613,170 | B1 * | 11/2009 | Grabelsky et al. ............. 370/352 |
| 8,064,452 | B2 | 11/2011 | Croak et al. |
| 8,355,314 | B2 | 1/2013 | Croak et al. |

(Continued)

FOREIGN PATENT DOCUMENTS

WO WO-01/86970 A 11/2001

OTHER PUBLICATIONS

Examiner's Report for CA 2,540,629, Dec. 7, 2009, copy consists of 8 pages.

(Continued)

*Primary Examiner* — John Pezzlo

(57) ABSTRACT

A method and apparatus for enabling calls destined for a terminating point on a packet network, e.g., a VoIP network, that is experiencing a service disruption to be forwarded by the network to another endpoint is disclosed. The method enables subscribers to register an alternative number, such as a cell phone number, a relative's phone number, or a work number, that the network can use to forward calls in the event of a service disruption. In one embodiment, the provider can even use an alternative transport network, such as the PSTN, to forward these calls until the VoIP network service is restored.

12 Claims, 4 Drawing Sheets

(56) References Cited

U.S. PATENT DOCUMENTS

| | | |
|---|---|---|
| 2001/0005372 A1 | 6/2001 | Cave et al. |
| 2002/0006137 A1 | 1/2002 | Rabenko et al. |
| 2002/0080751 A1 | 6/2002 | Hartmaier |
| 2002/0176557 A1 | 11/2002 | Burger |
| 2003/0007622 A1 | 1/2003 | Kalmanek et al. |
| 2003/0072270 A1 | 4/2003 | Guerin et al. |
| 2003/0076815 A1 | 4/2003 | Miller et al. |
| 2003/0185200 A1 | 10/2003 | Beyda |
| 2003/0185360 A1* | 10/2003 | Moore et al. ............ 379/114.01 |
| 2006/0106941 A1 | 5/2006 | Singhal et al. |
| 2006/0215543 A1 | 9/2006 | Croak et al. |
| 2006/0215830 A1 | 9/2006 | Simpson |
| 2006/0245350 A1 | 11/2006 | Shei et al. |
| 2006/0251052 A1* | 11/2006 | Croak et al. ................. 370/352 |
| 2008/0002669 A1 | 1/2008 | O'Brien et al. |
| 2009/0103526 A1 | 4/2009 | Croak et al. |
| 2009/0109959 A1* | 4/2009 | Elliott et al. .................. 370/352 |
| 2010/0098067 A1 | 4/2010 | Croak et al. |
| 2010/0226363 A1* | 9/2010 | McGuigan et al. ........... 370/352 |
| 2013/0094347 A1 | 4/2013 | Croak et al. |

OTHER PUBLICATIONS

Examination Report for EP 06 111 719.8, Jul. 21, 2008, copy consists of 3 pages.

EP Search Report Publication for EP 1705864 A1; published Sep. 27, 2006.

Zhu, X., et al., "IIN Model: Modifications and Case Study," Computer Networks, Elsevier Science Publishers B.V., Amsterdam, NL, vol. 35, No. 5, Apr. 2001, pages.

Search Report for EP 06112771.8, Aug. 22, 2006, copy consists of 8 pages.

Office Action for CA 2,544,114, Jan. 8, 2010, pp. 1-5.

* cited by examiner

METHOD AND APPARATUS FOR ROUTING CALLS TO AN ALTERNATIVE ENDPOINT DURING NETWORK DISRUPTIONS

This application is a continuation of U.S. patent application Ser. No. 11/109,130, filed on Apr. 19, 2005 now U.S. Pat. No. 8,064,452, which is currently allowed and is herein incorporated by reference in its entirety.

The present invention relates generally to communication networks and, more particularly, to a method and apparatus for routing calls to an alternative endpoint during network disruptions in packet networks, e.g. Voice over Internet Protocol (VoIP) networks.

BACKGROUND OF THE INVENTION

Providers of telephony network services sometimes experience momentary service disruptions that can prevent calls from being completed to a called endpoint. Even though these disruptions are rare they can cause high rates of customer dissatisfaction. There is no support today to automatically reach a second endpoint when the first called endpoint cannot be reached due to network problems.

Therefore, a need exists for a method and apparatus for routing calls to an alternative endpoint during network disruptions in a packet network, e.g., a VoIP network.

SUMMARY OF THE INVENTION

In one embodiment, the present invention enables calls destined for a terminating point on a packet network, e.g., a VoIP network, that is experiencing a service disruption to be forwarded by the network to another endpoint. The present invention enables subscribers to register an alternative number, such as a cell phone number, a relative's phone number, or a work number, that the network can use to forward calls to in the event of a service disruption. The provider can even use an alternative transport network, such as the PSTN, to forward these calls until the VoIP network service is restored.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
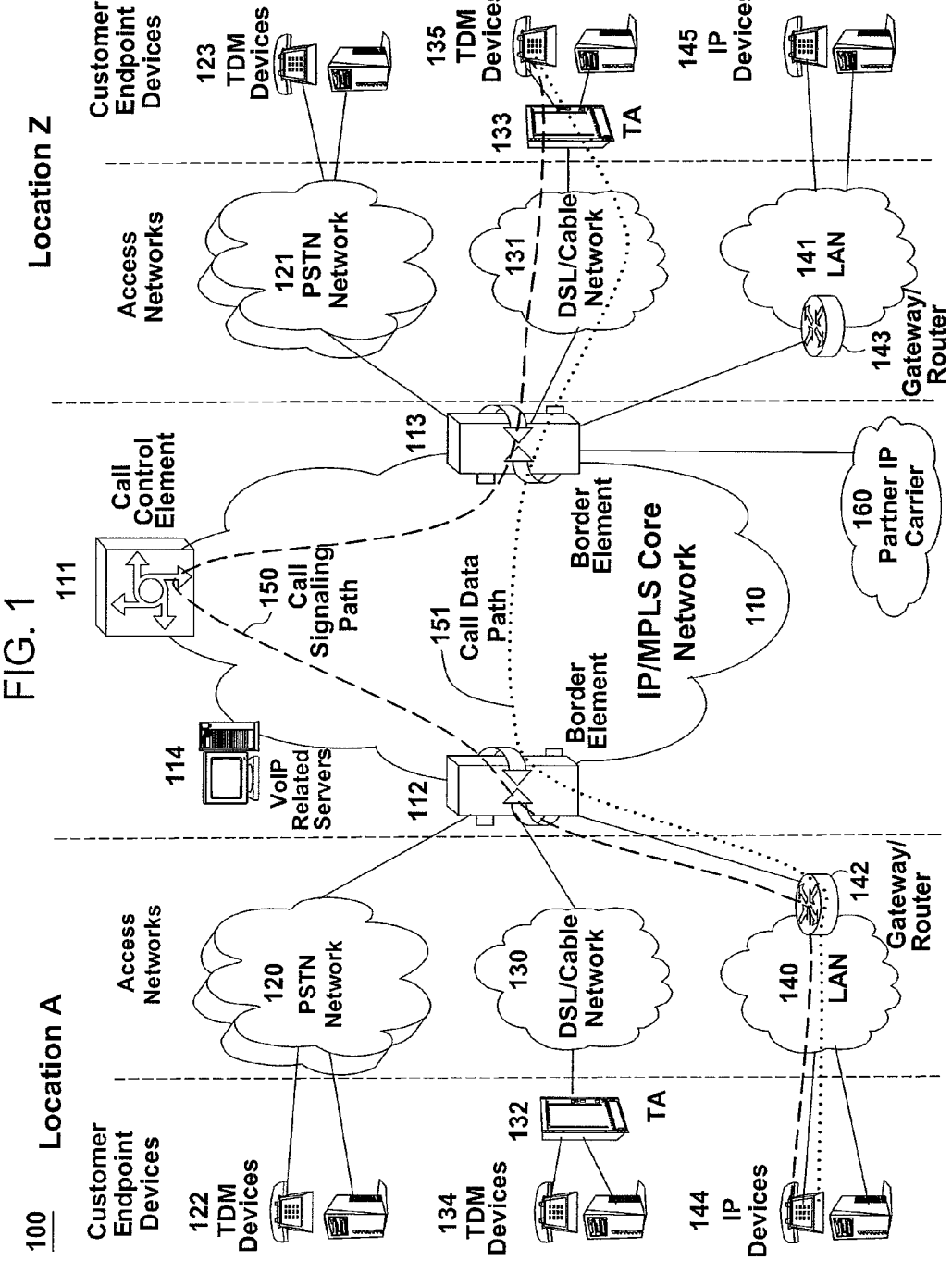
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Providers of telephony network services sometimes experience momentary service disruptions that can prevent calls from being completed to a called endpoint. Even though these disruptions are rare they can cause high rates of customer dissatisfaction. There is no support today to automatically reach a second endpoint when the first called endpoint cannot be reached due to network problems.

To address this criticality, the present invention enables calls destined for a terminating point on a packet network, e.g., a VoIP network, that is experiencing a service disruption to be forwarded by the packet network to another endpoint. The present invention enables subscribers to register an alternative number, such as a cell phone number, a relative's phone number, or a work number, that the packet network can use to forward calls to in the event of a service disruption. The provider can even use an alternative transport network, such as the PSTN, to forward these calls until the VoIP network service is restored.

Figure 2:
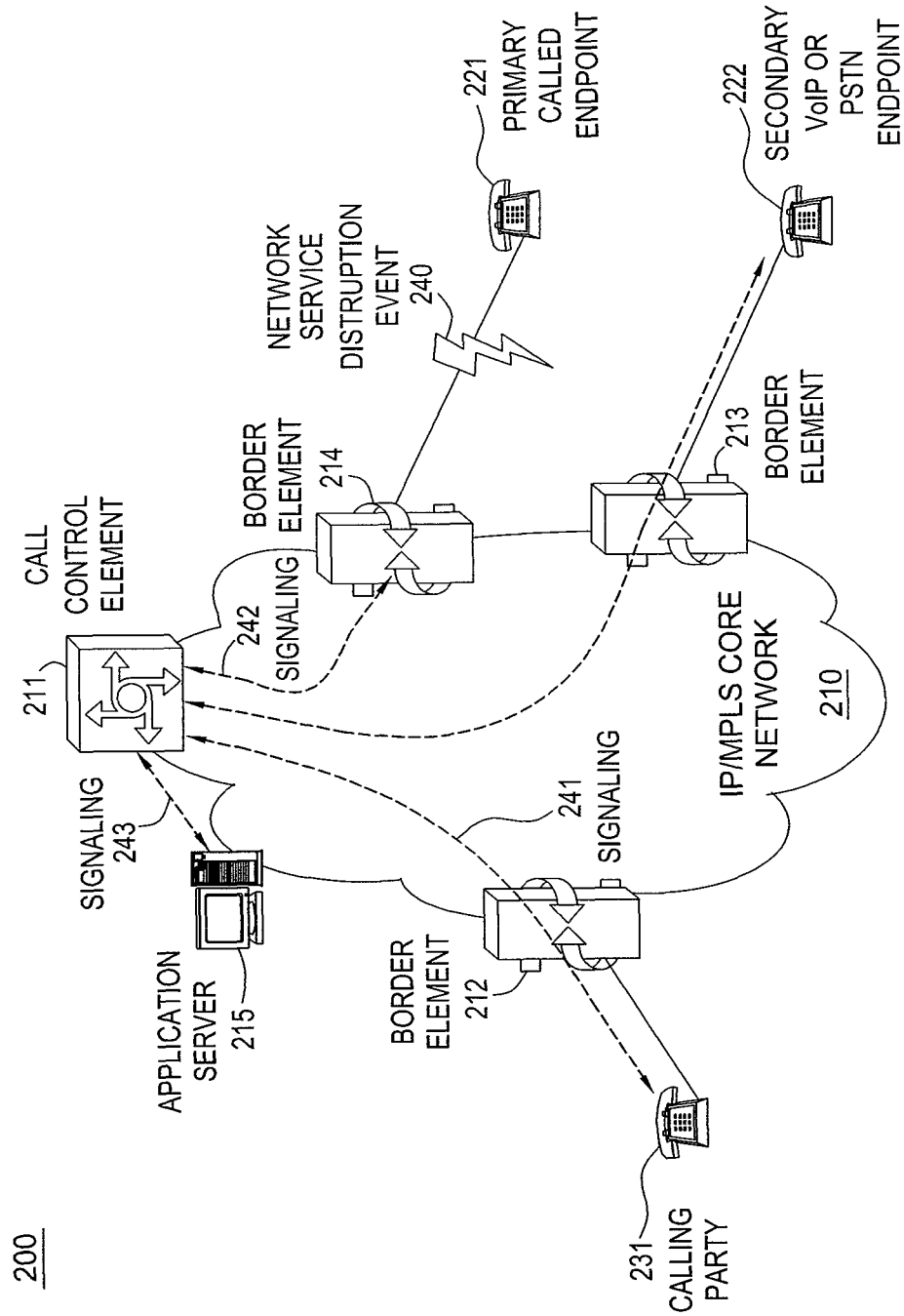
FIG. 2 illustrates an example of routing calls to an alternative endpoint during network disruptions in a VoIP network of the present invention.

FIG. 2 illustrates an example of routing calls to an alternative endpoint during network disruptions in a packet network, e.g., a VoIP network. In FIG. 2, calling party 231 makes a call to the primary called endpoint 221. CCE 211 receives the call setup message from endpoint 231, using flow 241, and then communicates with Application Server (AS) 215, using flow 243, to find out that endpoint 221 has subscribed to the routing calls to an alternative endpoint during network disruptions service feature. CCE 211 then forwards the call setup message, using flow 242, to BE 214 to attempt to reach endpoint 221. Endpoint 221, however, cannot be reached due to network service disruption event 240. CCE 211 receives a signaling message back from BE 214, using flow 242, indicating that endpoint 221 cannot be reached due to network service disruptions. CCE 211 then forwards the call setup message to BE 213 to attempt to reach a secondary endpoint 222 registered by the subscriber. Note that the call to the secondary endpoint 222 can be routed through the VoIP network or a PSTN network to ensure delivery of the call in the case that the VoIP network is experiencing service disruptions.

Figure 3:
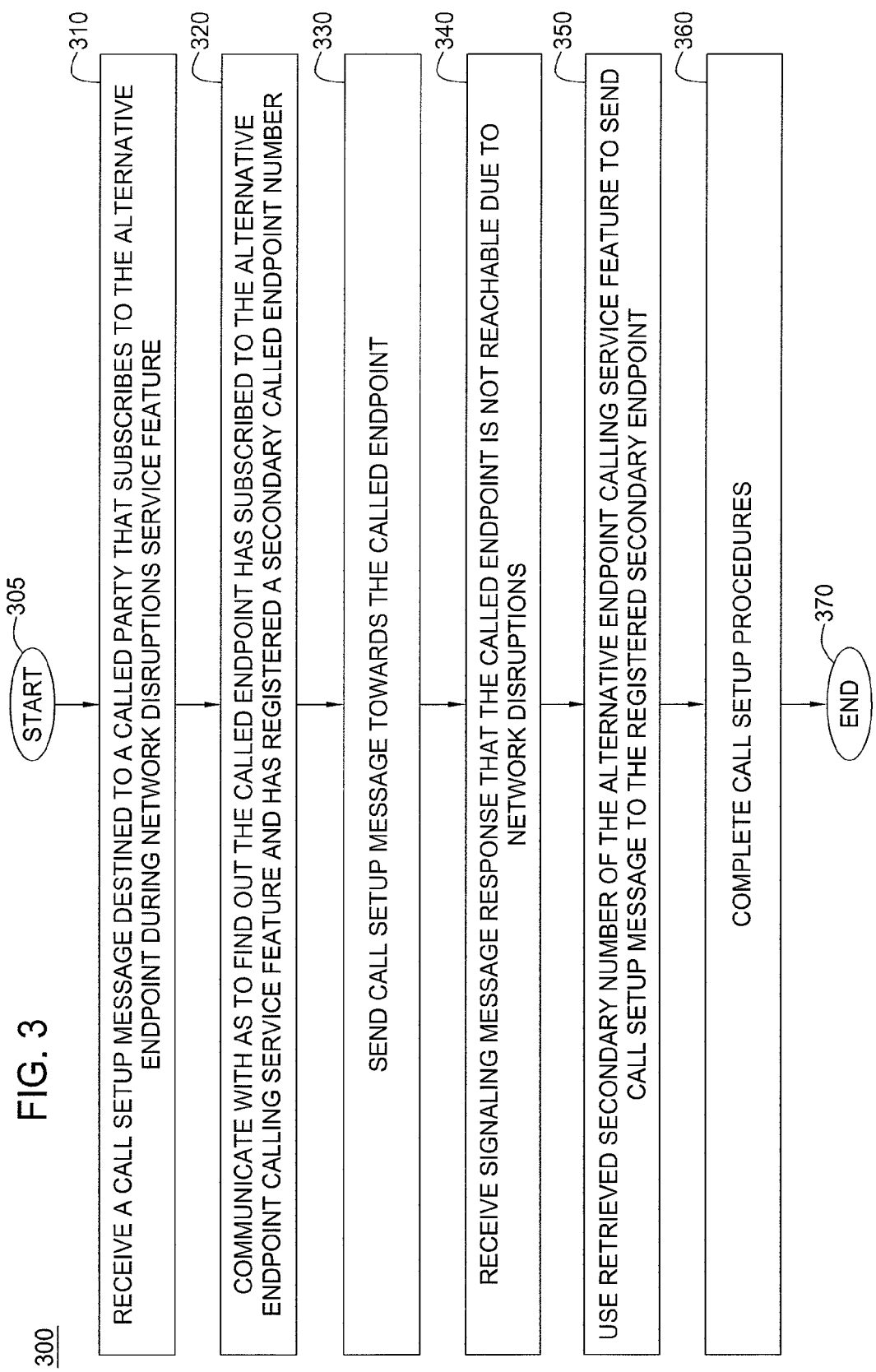
FIG. 3 illustrates a flowchart of a method for routing calls to an alternative endpoint during network disruptions in a VoIP network of the present invention.

FIG. 3 illustrates a flowchart of a method 300 for routing calls to an alternative endpoint during network disruptions in a packet network, e.g., a VoIP network. Method 300 starts in step 305 and proceeds to step 310.

In step 310, the method 300 receives a call setup message destined to a called party that has subscribed to the routing calls to an alternative endpoint during network disruptions service feature. In step 320, the method communicates with an AS to find out that the called endpoint has subscribed to the routing calls to an alternative endpoint during network disruptions service feature and has registered a secondary called endpoint number. In step 330, the method sends the call setup message towards the primary called endpoint. In step 340, the method receives a signaling message response that the called endpoint is not reachable due to network disruptions. In step 350, the method uses the retrieved secondary endpoint phone number of the routing calls to an alternative endpoint during network disruptions service feature to send the call setup message to the registered secondary endpoint. In step 360, the method completes the call setup procedures. The method ends in step 370.

Figure 4:
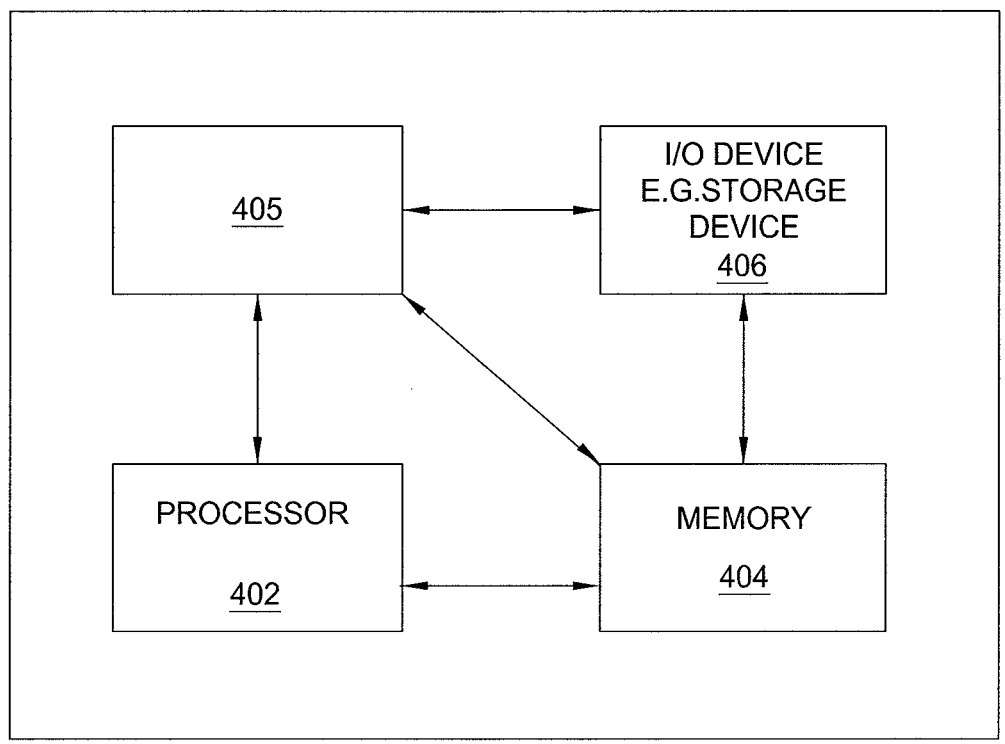
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a routing calls to an alternative endpoint module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present routing calls to an alternative endpoint module or process 405 can be loaded into memory 404 and executed by processor 402 to implement the functions as discussed above. As such, the present routing calls to an alternative endpoint process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for sending a call setup message to an alternative endpoint during a network disruption in a communication network, comprising:

receiving, by a processor, the call setup message to a primary endpoint of a subscriber that is unreachable due to the network disruption, wherein the network disruption is caused by a network problem; and sending, by the processor, the call setup message to the alternative endpoint registered by the subscriber, wherein the communication network comprises an internet protocol network, wherein the sending comprises sending the call setup message to the alternative endpoint via a time division multiplexing based telephone network, wherein the call setup message is sent via a first border element in the communication network that is different from a second border element that is used to reach the primary endpoint, wherein the alternative user endpoint is distinct from the primary endpoint, and wherein the alternative endpoint comprises a different telephone number that the primary endpoint.

2. The method of claim 1, wherein the receiving further comprises:

verifying the primary endpoint has a subscription to an alternative endpoint during service disruptions service feature.

3. The method of claim 1, wherein the processor comprises a processor of a call control element.

4. The method of claim 1, wherein the time division multiplexing based network comprises a public switched telephone network.

5. A non-transitory computer-readable medium storing instructions which, when executed by a processor, cause the processor to perform operations for routing a call sending a call setup message to an alternative endpoint during a network disruption in a communication network, the operations comprising:

receiving call setup message to a primary endpoint of a subscriber that is unreachable due to the network disruption, wherein the network disruption is caused by a network problem; and sending the call setup message to the alternative endpoint registered by the subscriber, wherein the communication network comprises an internet protocol network, wherein the sending comprises sending the call setup message to the alternative endpoint via a time division multiplexing based telephone network, wherein the call setup message is sent via a first border element in the communication network that is different from a second border element that is used to reach the primary endpoint, wherein the alternative endpoint is distinct from the primary endpoint, and wherein the alternative endpoint comprises a different telephone number the primary endpoint.

6. The non-transitory computer-readable medium of claim 5, wherein the receiving further comprises:

verifying the primary endpoint has a subscription to an alternative endpoint during service disruptions service feature.

7. The non-transitory computer-readable medium of claim 5, wherein the processor comprises a processor of a call control element.

8. The non-transitory computer-readable medium of claim 5, wherein the time division multiplexing based network comprises a public switched telephone network.

9. An apparatus for sending a call setup message to an alternative endpoint during a network disruption in a communication network, comprising:

a processor; and a non-transitory computer-readable medium storing instructions which, when executed by the processor, cause the processor to perform operations, the operations comprising:

receiving the call setup message to a primary endpoint of a subscriber that is unreachable due to the network disruption, wherein the network disruption is caused by a network problem; and sending the call setup message to the alternative endpoint registered by the subscriber, wherein the communication network comprises an internet protocol network, wherein the sending comprises sending the call setup message to the alternative endpoint via a time division multiplexing based telephone network, wherein the call setup message is sent via a first border element in the communication network that is different from a second border element that is used to reach the primary endpoint, wherein the alternative endpoint is distinct from the primary endpoint, and wherein the alternative endpoint comprises a different telephone number that the primary endpoint.

10. The apparatus of claim 9, wherein the receiving further comprises:

verifying the primary endpoint has a subscription to an alternative endpoint during service disruptions service feature.

11. The apparatus of claim 9, wherein the processor comprises a processor of a call control element.

12. The apparatus of claim 9, wherein the time division multiplexing based network comprises a public switched telephone network.

* * * * *